(12) United States Patent
Yang et al.

(10) Patent No.: US 12,099,232 B2
(45) Date of Patent: Sep. 24, 2024

(54) BACKLIGHT MODULE AND MOBILE TERMINAL

(71) Applicant: Wuhan China Star Optoelectronics Technology Co., Ltd., Hubei (CN)

(72) Inventors: Yong Yang, Hubei (CN); Jiedong Han, Hubei (CN); Fancheng Liu, Hubei (CN); Guowei Zha, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/790,222

(22) PCT Filed: Jun. 29, 2022

(86) PCT No.: PCT/CN2022/102127
§ 371 (c)(1),
(2) Date: Jun. 30, 2022

(87) PCT Pub. No.: WO2023/231112
PCT Pub. Date: Dec. 7, 2023

(65) Prior Publication Data
US 2024/0176061 A1   May 30, 2024

(30) Foreign Application Priority Data
Jun. 2, 2022  (CN) .......................... 202210624845.2

(51) Int. Cl.
*G02B 6/00* (2006.01)
*F21V 8/00* (2006.01)
*G02F 1/13357* (2006.01)

(52) U.S. Cl.
CPC ...... *G02B 6/0088* (2013.01); *G02F 1/133605* (2013.01)

(58) Field of Classification Search
CPC .................................................. G02B 6/0088
See application file for complete search history.

(56) References Cited

U.S. PATENT DOCUMENTS

| 10,649,133 B2 * | 5/2020 | Kautz ..................... B60Q 3/64 |
| 2019/0265549 A1 | 8/2019 | Chen et al. |

(Continued)

FOREIGN PATENT DOCUMENTS

| CN | 104749818 | 7/2015 |
| CN | 107238979 | 10/2017 |

(Continued)

OTHER PUBLICATIONS

International Search Report and the Written Opinion Dated Dec. 16, 2022 From the International Searching Authority Re. Application No. PCT/CN2022/102127 and Its Translation Into English. (17 Pages).

(Continued)

*Primary Examiner* — Gerald J Sufleta, II (57) ABSTRACT

The present application discloses a backlight module and a mobile terminal. The backlight module includes a reflection layer and a light adjustment layer that are arranged oppositely, wherein he reflection layer is disposed at a periphery of each of light sources, the light adjustment layer includes first light guide portions and a second light guide portion, a light transmittance of each of the first light guide portions is lower than a light transmittance of the second light guide portion, and the reflection layer includes a diffuse reflection sub-layer at least partially overlapping with at least one of the second light guide portion, and a specular reflection sub-layer at least partially overlapping with at least one of the first light guide portions.

20 Claims, 4 Drawing Sheets

(56) References Cited

U.S. PATENT DOCUMENTS

| | | | | |
|---|---|---|---|---|
| 2021/0255507 A1* | 8/2021 | Ouyang | ............ | G02F 1/133603 |
| 2023/0142417 A1* | 5/2023 | Allen | ................ | G02F 1/133602 |
| | | | | 362/97.1 |
| 2023/0161197 A1* | 5/2023 | Du | ........................ | G02B 6/0058 |
| | | | | 362/97.2 |

FOREIGN PATENT DOCUMENTS

| | | |
|---|---|---|
| CN | 107797337 | 3/2018 |
| CN | 210244014 | 4/2020 |
| CN | 111308781 | 6/2020 |
| CN | 111929946 | 11/2020 |
| CN | 212379689 | 1/2021 |
| CN | 112394431 | 2/2021 |
| CN | 113031347 | 6/2021 |
| CN | 113126363 | 7/2021 |
| CN | 114566092 | 5/2022 |

OTHER PUBLICATIONS

Notification of Office Action and Search Report Dated Dec. 28, 2022 From the State Intellectual Property Office of the People's Republic of China Re. Application No. 202210624845.2 and Its Translation Into English. (20 Pages).

\* cited by examiner

BACKLIGHT MODULE AND MOBILE TERMINAL

RELATED APPLICATIONS

This application is a National Phase of PCT Patent Application No. PCT/CN2022/102127 having International filing date of Jun. 29, 2022, which claims the benefit of priority of Chinese Patent Application No. 202210624845.2 filed on Jun. 2, 2022. The contents of the above applications are all incorporated by reference as if fully set forth herein in their entirety.

FIELD AND BACKGROUND OF THE INVENTION

The present application relates to a field of display, and in particular, to a backlight module and a mobile terminal.

A backlight module using mini-LED as a backlight source has many advantages such as high contrast, partition control, and low power consumption, and can be applied to products of different sizes from mobile phones to TVs according to product specifications.

However, due to factors such as a substrate of a lamp board and a thickness of multiple films, mini-LEDs are usually thicker than conventional edge-lit backlights, and thus applying mini-LED backlights in consumer electronic products is not in line with market development needs. In the prior art, there are many feasible ways to reduce a thickness of mini-LED backlights, but on the other hand, they have many negative effects. For example, increasing an arrangement density of mini-LEDs will lead to higher costs. Installing a uniform light diffusion sheet will lead to reduced light efficiency, etc., and impact flexible and bendable characteristics of the backlight module.

SUMMARY OF THE INVENTION

Embodiments of the present application provide a backlight module and a mobile terminal to solve the technical problems that the backlight module is thick and a large-angle bending performance of the backlight module is weak.

In order to solve the above-mentioned problems, the technical solutions provided by the present application are as follows:

An embodiment of the present application provides a backlight module, including:
  a substrate;
  a plurality of light sources arranged on the substrate at intervals;
  a reflection layer disposed on the substrate and adjacent to at least one of the light sources;
  an encapsulation layer disposed on the light sources and the reflection layer; and
  a light adjustment layer disposed on a side of the encapsulation layer away from the light sources, wherein the light adjustment layer includes a plurality of first light guide portions and a plurality of second light guide portions, one of the first light guide portions and one of the light sources are arranged opposite to each other, each of the second light guide portions is arranged between the first light guide portions, and a light transmittance of the first light guide portions is smaller than a light transmittance of the second light guide portions;
wherein the reflection layer includes a specular reflection sub-layer and a diffuse reflection sub-layer, the diffuse reflection sub-layer overlaps with at least a part of at least one of the second light guide portions, and the specular reflection sub-layer overlaps with at least a part of at least one of the first light guide portions.

In one embodiment, the diffuse reflection sub-layer is stacked on the specular reflection sub-layer, or
  the specular reflection sub-layer is provided with an opening, and the diffuse reflection sub-layer is disposed in the opening.

In one embodiment, the diffuse reflection sub-layer partially overlaps with at least one of the first light guide portions.

In one embodiment, each of the first light guide portions includes a plurality of first openings, each of the second light guide portions includes at least one second opening, and a total area of the plurality of first openings is smaller than a total area of the at least one second opening.

In one embodiment, in each of the first light guide portions, a plurality of the first openings have a plurality of opening areas, one of the first openings facing one of the light sources is a central opening, and an area of the central opening is smaller than each area of remaining of the first openings.

In one embodiment, among any two of the first openings having different distances from the central opening, an area of one of the first openings close to the central opening is less than an area of another one of the first openings away from the central opening.

In one embodiment, an opening area of the central opening is less than or equal to 2% of a light-emitting area of a corresponding one of the light sources, each of the first light guide portions includes at least one annular light guide sub-portion, distances from the central opening to different ones of the annular light guide sub-portions are different, and a total opening area of the first openings on any annular guide sub-portion is less than or equal to 30% of an area of the annular guide sub-portion.

In one embodiment, the backlight module further includes:
  an adhesive layer disposed on a side of the light adjustment layer away from the light sources, and covering the light adjustment layer; and
  a color conversion layer disposed on a side of the adhesive layer away from the light adjustment layer, wherein a plurality of micro-reflection structures is disposed on a side of the color conversion layer away from the adhesive layer, and the micro-reflection structures include one of pyramids, prism glass, or prisms.

In one embodiment, a spacing between the micro-reflection structures is 10 um to 100 um, and a height of the micro-reflection structures is 5 um to 50 um.

In one embodiment, a material of the light adjustment layer includes any one of aluminum and silver, and a reflectivity of the light adjustment layer is greater than or equal to 90%.

In one embodiment, the encapsulating adhesive layer is doped with diffusion powder, and a mass concentration of the diffusing powder doped in the encapsulating adhesive layer is 10%-20%.

In one embodiment, a material of the specular reflection sub-layer includes one of gold, silver, aluminum, copper, and alloys thereof, a material of the diffuse reflection sub-layer includes diffusion particles and an organic resin-based material, the organic resin-based material includes ink or white photoresist, and the diffusion particles include at least one of silicon dioxide and titanium dioxide.

The present application also provides a mobile terminal, including a backlight module and a display body, the display body and the backlight module are combined into a whole, and the backlight module includes:
- a substrate;
- a plurality of light sources arranged on the substrate at intervals;
- a reflection layer disposed on the substrate and adjacent to at least one of the light sources;
- an encapsulation layer disposed on the light sources and the reflection layer.
- a light adjustment layer disposed on a side of the encapsulation layer away from the light sources, wherein the light adjustment layer includes a plurality of first light guide portions and a plurality of second light guide portions, one of the first light guide portions and one of the light sources are arranged opposite to each other, each of the second light guide portions is arranged between the first light guide portions, and a light transmittance of the first light guide portions is smaller than a light transmittance of the second light guide portions;
- wherein the reflection layer includes a specular reflection sub-layer and a diffuse reflection sub-layer, the diffuse reflection sub-layer overlaps with at least a part of at least one of the second light guide portions, and the specular reflection sub-layer overlaps with at least a part of at least one of the first light guide portions.

In one embodiment, the diffuse reflection sub-layer is stacked on the specular reflection sub-layer, or
- the specular reflection sub-layer is provided with an opening, and the diffuse reflection sub-layer is disposed in the opening.

In one embodiment, the diffuse reflection sub-layer partially overlaps with at least one of the first light guide portions.

In one embodiment, each of the first light guide portions includes a plurality of first openings, each of the second light guide portions includes at least one second opening, and a total area of the plurality of first openings is smaller than a total area of the at least one second opening.

In one embodiment, in each of the first light guide portions, a plurality of the first openings have a plurality of opening areas, one of the first openings facing the one of the light sources is a central opening, and an area of the central opening is smaller than each area of remaining of the first openings.

In one embodiment, among any two of the first openings having different distances from the central opening, an area of one of the first openings close to the central opening is less than an area of another one of the first openings away from the central opening.

In one embodiment, an opening area of the central opening is less than or equal to 2% of a light-emitting area of a corresponding one of the light sources, each of the first light guide portions includes at least one annular light guide sub-portion, distances from the central opening to different ones of the annular light guide sub-portions are different, and a total opening area of the first openings on any annular guide sub-portion is less than or equal to 30% of an area of the annular guide sub-portion.

In one embodiment, the mobile terminal further includes:
- an adhesive layer disposed on a side of the light adjustment layer away from the light sources, and covering the light adjustment layer; and
- a color conversion layer is arranged on a side of the adhesive layer away from the light adjustment layer, wherein a plurality of micro-reflection structures is disposed on a side of the color conversion layer away from the adhesive layer, and the micro-reflection structures include one of pyramids, prism glass, or the prisms.

In the present application, the light adjustment layer and the reflection layer are arranged oppositely, the light adjustment layer includes a plurality of first light guide portions and a plurality of second light guide portions, one of the first light guide portions is arranged opposite one of the light sources, the second light guide portions are arranged between the first light guide portions, the light transmittance of the first light guide portions is lower than that of the second light guide portions, the reflection layer includes a specular reflection sub-layer and a diffuse reflection sub-layer, the diffuse reflection sub-layer overlaps at least partially with at least one of the second light guide portions, and the specular reflection sub-layer overlaps at least partially with at least one of the first light guide portions, that is, the diffuse reflection sub-layer is arranged corresponding to one of the second light guide portions, and the specular reflection sub-layer is arranged corresponding to one of the first light guide portions. Light transmission is carried out by a combination of the specular reflection sub-layer and the diffuse reflection sub-layer, the light emitted by the light sources forms a large-angle light transmission between a light source port and a near-light source area through a light adjustment layer and a specular reflection sub-layer, which guides more light to a position of the gap of the light sources, and at the position of the gap of the light sources, the diffuse reflection coating is used to change a large-angle propagation mode of the light at the position of the gap of the light sources, so that it can emit light in a front view direction, increase the brightness between the light sources, and achieve an effect of uniform light output on an entire surface of the backlight module. The above technical solution can replace the conventional uniform light film in the mini-LED backlight module to greatly reduce a thickness of the backlight module. Since the thickness of the backlight module is effectively reduced, the backlight module can also have better large-angle bending performance.

DESCRIPTION OF SPECIFIC EMBODIMENTS OF THE INVENTION

The present application provides a backlight module and a mobile terminal. In order to make the purpose, technical solution, and effect of the present application clearer and more definite, the present application is further described in detail below with reference to the accompanying drawings and examples. It should be understood that the specific embodiments described herein are only used to explain the present application, and are not used to limit the present application.

Embodiments of the present application provide a backlight module and a mobile terminal. Each of them will be described in detail below. It should be noted that the description order of the following embodiments is not intended to limit the preferred order of the embodiments.

At present, in the prior art, a thickness of a device is usually reduced by the following methods: 1. Using thin flexible circuit board substrates to replace conventional printed circuit substrates and glass substrates for thinning the substrate; 2. Using small-sized and high-density arranged mini-LEDs, wherein due to the high-density arrangement of the light sources, a light mixing distance required by optical waveguides between the light sources is reduced, thereby reducing an overall backlight thickness of the mini-LEDs; 3. Using large-angle mini-LED light sources, wherein a light distribution of the large-angle mini-LED light sources is more conducive to the mini-LED light sources to emit light from a large angle direction, which is more conducive to a light transmission and emission between the mini-LED light sources, thereby reducing the overall thickness of the backlight module; and 4. Using a uniform light film, wherein a function of the uniform light film is to break up a point light source into multiple point light sources, increase a luminous area of the light source, reduce a number of films, and reduce the overall thickness of the backlight module.

However, the above solutions relatively produce many negative effects. In order to solve the above technical problems, the present application provides a backlight module and a mobile terminal. For details, refer to FIGS. 1-9 and the following embodiments.

As shown in FIGS. 1-9, an embodiment of the present application provides a backlight module, including:
- a substrate 10;
- a plurality of light sources 50 arranged on the substrate 10 at intervals;
- a reflection layer 20 disposed on the substrate 10 and adjacent to at least one of the light sources 50;
- an encapsulation layer 30 disposed on the light sources 50 and the reflection layer 20;
- a light adjustment layer 40 disposed on the side of the encapsulation layer 30 away from the light source 50, wherein the light adjustment layer 40 includes a plurality of first light guide portions A1 and a plurality of second light guide portions A2. One of the first light guide portions A1 is disposed opposite to one of the light sources 50, the second light guide portions A2 are disposed between the first light guide portions A1, and a light transmittance of the first light guide portions A1 is less than a light transmittance of the second light guide portions A2;

The reflection layer 20 includes a specular reflection sub-layer 201 and a diffuse reflection sub-layer 202, the diffuse reflection sub-layer 202 overlaps with at least a part of at least one of the second light guide portions A2, and the specular reflection sub-layer 201 at least partially overlaps with at least one of the first light guide portions A1.

Specifically, the backlight module of the present application is a direct-lit backlight module, the substrate 10 is a flexible substrate, and its material includes but is not limited to polyimide.

Figure 1:
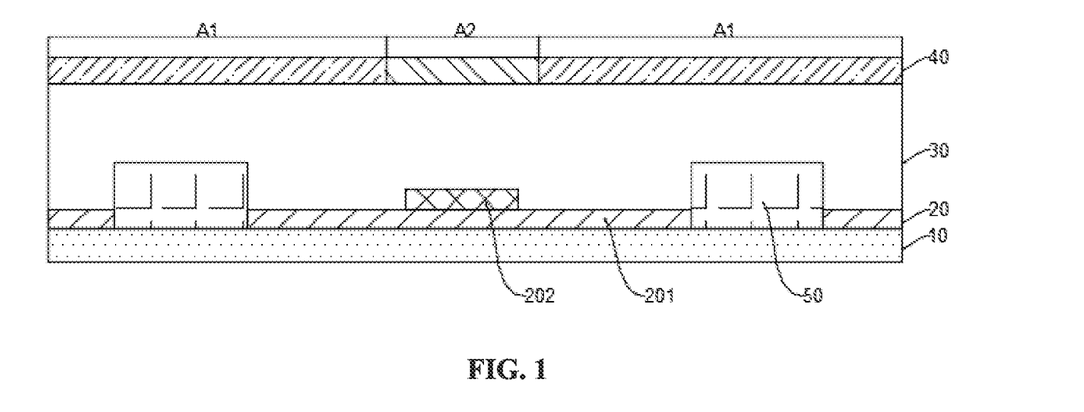
FIG. 1 is a schematic structural diagram of a backlight module provided by an embodiment of the present application.
Figure 5:
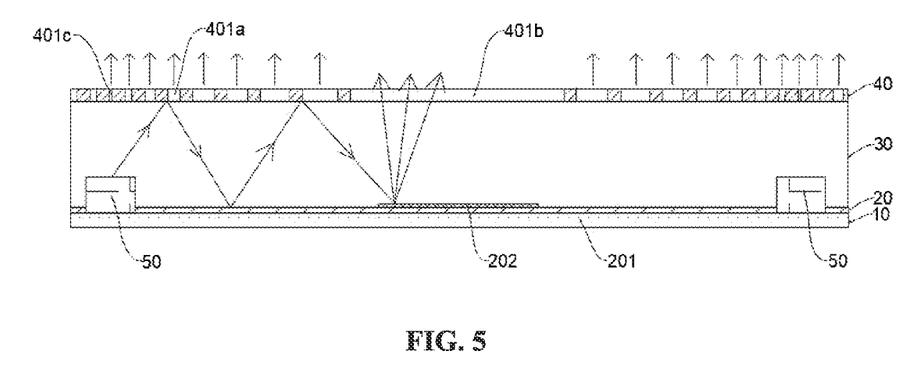
FIG. 5 is a light path diagram of light propagating in the backlight module provided by an embodiment of the present application.
Figure 6:
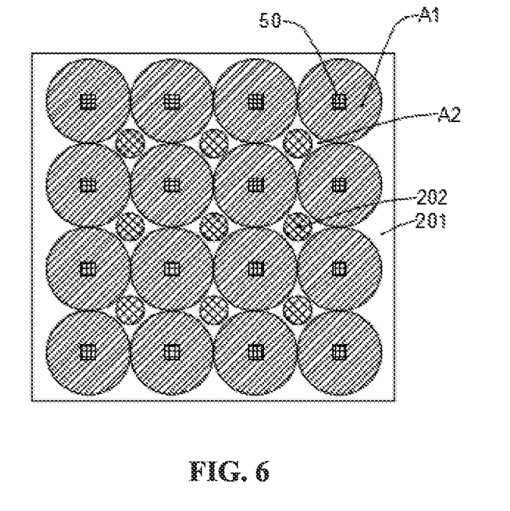
FIG. 6 is a top view of a structure of a light adjustment layer and a reflection layer provided by an embodiment of the present application.

Specifically, as shown in FIG. 1, the light sources 50 are arranged on the substrate 10 at intervals, and the spacing distances between the light sources 50 are not shown. The light sources 50 are arranged in a dot matrix on the substrate in the first embodiment of the present application as an illustrative example. The dot matrix arrangement is shown in FIGS. 5 and 6. In a specific example, the light source 50 may be a mini-LED light-emitting device.

Specifically, as shown in FIG. 1, the reflection layer 20 is disposed around each of the light sources 50 on the substrate 10 to reflect the light emitted by the light sources 50 in the backlight module. The reflection layer 20 in the present application includes a specular reflection sub-layer 201 and a diffuse reflection sub-layer 202. The diffuse reflection sub-layer 202 can be disposed on the specular reflection sub-layer 201. The specular reflection sub-layer 201 is laid on an entire surface of the substrate 10 (except for positions of the light sources 50), and the diffuse reflection sub-layer 202 may also be provided in a same layer as the specular reflection sub-layer 201.

It should be noted that when the light irradiates the specular reflection sub-layer 201, specular reflection occurs. Specular reflection means that the reflective surface is smooth. Diffuse reflection occurs on the diffuse reflection sub-layer 202, and the diffuse reflection refers to the reflection of light projected on the rough surface in all directions.

Specifically, in embodiments of the present application, a material of the specular reflection sub-layer 201 includes, but is not limited to high-reflection metal materials, which may specifically be gold, silver, aluminum, copper or alloys thereof, etc. "Reflection" in the present application means that a specular reflection ratio of the material is not less than 90%.

Specifically, in the embodiments of the present application, a material of the diffuse reflection sub-layer 202 includes, but is not limited to, an organic resin-based mixture containing diffusing particles, and the organic resin-based material may be ink or white photoresist, wherein the diffusing particles include, but are not limited to inorganic particles or polymer material particles, such as silicon dioxide, titanium dioxide, etc., and may have a diameter ranging from 1 um to 10 um, and the diffuse reflection ratio of the diffuse reflection sub-layer 202 is not less than 90%.

Specifically, the encapsulation layer 30 is disposed on the light sources 50 and the reflection layer 20, and covers an entire surface of the light sources 50 and the reflection layer 20. The encapsulation layer 30 is made of encapsulant, which may be any one of epoxy encapsulant, silicone encapsulant, polyurethane encapsulant, and ultraviolet light curing encapsulant.

Specifically, the light adjustment layer 40 is disposed on a side of the encapsulation layer 30 away from the substrate 10, so that a distance is present between the light adjustment layer 40 and the reflection layer 20 (which are disposed at intervals). The light adjustment layer 40 is parallel to the reflection layer 20, the light adjustment layer 40 includes a plurality of first light guide portions A1 and a plurality of second light guide portions A2, and the second light guide portions A2 are arranged between the first light guide portions A1.

Figure 7:
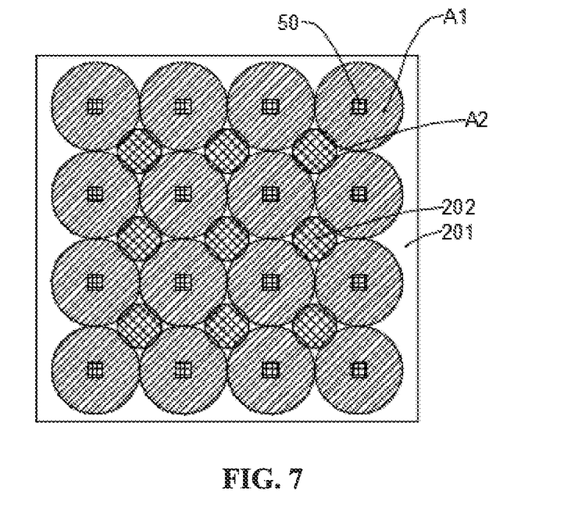
FIG. 7 is a top view of a structure of another light adjustment layer and a reflection layer provided by an embodiment of the present application.

Specifically, as shown in FIG. 6 and FIG. 7, the first light guide portions A1 is circular, and the first light guide portions A1 may also be rectangular. In the present application, taking the circular first light guide portions A1 as an example for description, the first light guide portions A1 are provided corresponding to the light sources 50, it is appreciated that a vertical projection of the first light guide portions A1 on the substrate 10 at least covers the light sources 50, each of the second light guide portions A2 is disposed between adjacent two or adjacent four of the first light guide portions A1, and each of the second light guide portions A2 is disposed corresponding to the gap between adjacent two of the light sources 50 or adjacent four of the light sources 50. It is appreciated that a vertical projection of the second light guide portions A2 on the substrate 10 at least covers a center between adjacent two of the light sources 50 or adjacent four of the light sources 50.

Specifically, a shape of the first light guide portions A1 is not particularly limited, and may be any one of a circle, a rectangle, a triangle, and a regular polygon.

Specifically, an orthographic projection of the specular reflection sub-layer on the light adjustment layer at least partially overlaps with at least one of the first light guide portions, which means that the specular reflection sub-layer 201 of the reflection layer 20 is disposed corresponding to the first light guide portion A1; and an orthographic projection of the diffuse reflection sub-layer on the light adjustment layer at least partially overlaps with at least one of the second light guide portions, which means that the diffuse reflection sub-layer 202 is disposed corresponding to the second light guide portion A2, and the diffuse reflection sub-layer 202 may overlap with the projection portion of the first light guide portions A1, as shown in FIG. 7. The diffuse reflection sub-layer 202 may also be located within a projection of the second light guide portions A2, as shown in FIG. 6.

Specifically, the first light guide portions A1 and the second light guide portions A2 have different light transmittances, and the light transmittance of the first light guide portions A1 is smaller than the light transmittance of the second light guide portions A2.

Figure 2:
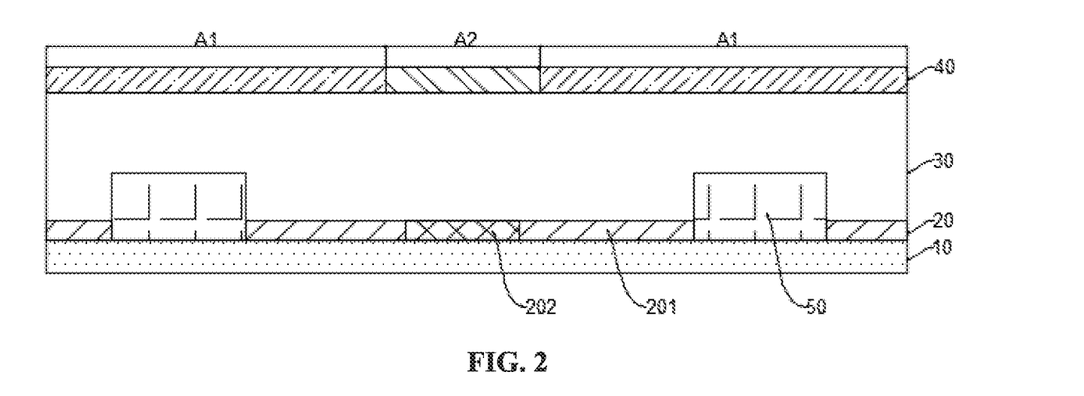
FIG. 2 is a schematic structural diagram of another backlight module provided by an embodiment of the present application.

In a specific example, as shown in FIG. 2, the first light guide portions A1 and the second light guide portions A2 may be disposed in two layers of different materials, respectively; and the light transmittances of the materials of the two layers have different light transmittances.

Figure 3:
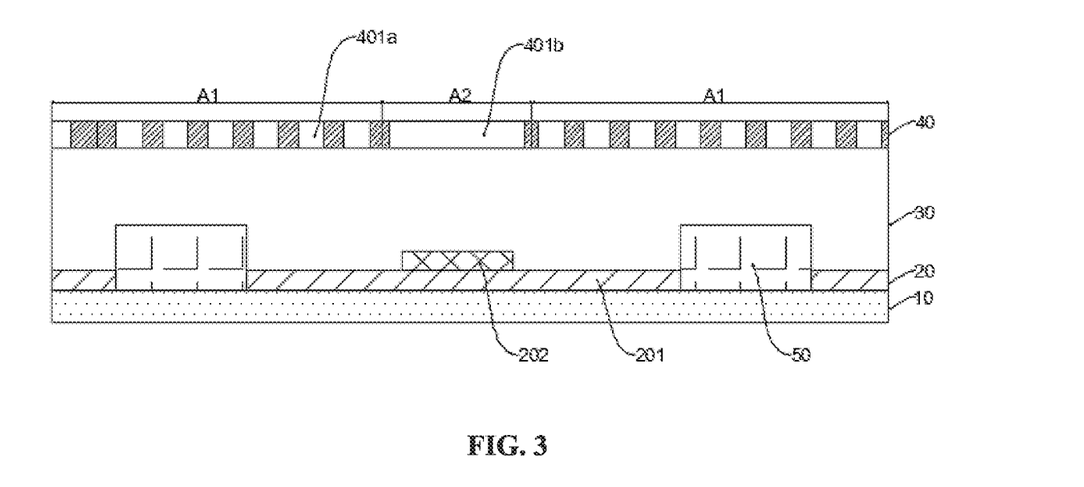
FIG. 3 is a schematic structural diagram of a backlight module with a patterned light adjustment layer provided by an embodiment of the present application.

In another specific example, as shown in FIG. 3, the first light guide portions A1 and the second light guide portions A2 may also be films with the same material but different aperture ratios. Each of the first light guide portions A1 has a first opening 401a, and each of the second light guide portions A2 has a second opening 401b. The first opening 401a and the second opening 401b can be filled with transparent organic materials (specifically, transparent optical glue) to ensure that the backlight module has good bending and recovery performance, and the shapes of the first opening 401a and the second opening 401b can also be well maintained.

In another specific example, based on the above example, the second light guide portion A2 may even be an opening surrounded by at least adjacent three of the first light guide portions A1 (an opening surrounded by adjacent four of the first light guide portions A1 in this embodiment). The light transmittance of the second light guide portions A2 is greater than that of the first light guide portions A1.

Specifically, in this embodiment, a material of the light adjustment layer 40 includes a high-reflection metal material, such as aluminum or silver, whose comprehensive light reflectivity is not less than 90%.

The principle of the embodiment of the present application is specifically shown in FIG. 5, a part of the light emitted by the light sources 50 is emitted out through the light adjustment layer 40, and the other part of the light is light-conducted between the light adjustment layer 40 and the reflection layer 20. The light adjustment layer 40 and the specular reflection sub-layer 201 are arranged in areas of the lamp port and near the lamp port, the light is transmitted as specular reflection in this section with a less internal light loss, so that the light can be transmitted to a middle of the adjacent light sources 50 as much as possible, and then pass through a corresponding one of the diffuse reflection sub-layer 202 which changes the propagation direction of the light. As such, the light is emitted from the second light guide portions A2, which increases the brightness of the position between the lamps, and achieves the effect of uniform light output on the entire surface of the backlight module.

It is appreciated that, in this embodiment, by arranging the light adjustment layer 40 and the reflection layer 20 opposite to each other, the light adjustment layer 40 includes a plurality of first light guide portions A1 and a plurality of second light guide portions A2, the first light guide portions A1 are disposed opposite to the light sources 50, the second light guide portions A2 are arranged between the first light guide portions A1, the light transmittance of the first light guide portions A1 is lower than the light transmittance of the second light guide portions A2, and a reflection layer is provided 20 includes a specular reflection sub-layer 201 and a diffuse reflection sub-layer 202, the diffuse reflection sub-layer 202 overlaps with at least a part of at least one of the second light guide portions A2, and the specular reflection sub-layer 201 overlaps with at least a part of at least one of the first light guide portions A1. The diffuse reflection sub-layer 202 is arranged corresponding to the second light guide portion A2, and the specular reflection sub-layer 201 is arranged corresponding to the first light guide portion A1. Light transmission is carried out by a combination of the specular reflection sub-layer 201 and the diffuse reflection sub-layer 202, the light emitted by the light sources 50 forms a large-angle light transmission between a light source port and a near-light source area through a light adjustment layer 40 and a specular reflection sub-layer 201, which guides more light to a position of the gap of the light sources 50, and at the position of the gap of the light sources 50, the diffuse reflection coating is used to change a large-angle propagation mode of the light at the position of the gap of the light sources 50, so that it can emit light in a front view direction, increase the brightness between the light sources 50, and achieve an effect of uniform light output on an entire surface of the backlight module. The above technical solution can replace the conventional uniform light film in the mini-LED backlight module (the uniform light film is thick, and the bending with a small radius cannot be realized), to greatly reduce a thickness of the backlight module. Since the thickness of the backlight module is reduced from 1.5-2 mm to less than 0.5 mm, a backlight module that can both emit light evenly and bend at a large angle is obtained.

In one embodiment, the diffuse reflection sub-layer 202 is stacked on the specular reflection sub-layer 201.

Alternatively, the specular reflection sub-layer 201 is provided with an opening, and the diffuse reflection sub-layer 202 is provided in the opening.

Specifically, as shown in FIG. 2, the diffuse reflection sub-layer 202 and the specular reflection sub-layer 201 are provided in the same layer.

Specifically, as shown in FIG. 3, the diffuse reflection sub-layer 202 is stacked on the specular reflection sub-layer 201.

It is appreciated that the above two embodiments have their own advantages and disadvantages, and may be selected according to the actual production situation. Setting the diffuse reflection sub-layer 202 and the specular reflection sub-layer 201 in the same layer can make all intervals between the reflection layer 20 and the light adjustment layer 40 uniform, and the uniform light effect is better. In another technical solution, the diffuse reflection sub-layer 202 is directly disposed on the specular reflection sub-layer 201 by means of coating or printing, which is simpler in the manufacturing method and does not require additional patterning process for the specular reflection sub-layer 201, thereby reducing the production cost.

In one embodiment, as shown in FIG. 7, the diffuse reflection sub-layer 202 partially overlaps with at least one of the first light guide portions A1.

Specifically, as shown in FIG. 7, a portion of an edge of the diffuse reflection sub-layer 202 overlaps with an orthographic projection of the first light guide portions A1 on the substrate 10, so that the reflection layer 20 and the diffuse reflection sub-layer 202 form a transition area near a junction between the first light guide portions A1 and the second light guide portions A2, so that the light emitted by the diffuse reflection sub-layer 202 can be emitted out corresponding to the second light guide portions A2 as much as possible, making the backlight module have a better uniform light effect.

It is appreciated that, by setting the orthographic projection of the diffuse reflection sub-layer 202 on the substrate 10 to partially overlap with the orthographic projection of the first light guide portions A1 on the substrate 10, the second light guide portions A2 can emit light as evenly as possible, so that the backlight module has a better uniform light effect.

In one embodiment, each of the first light guide portions A1 includes a plurality of first openings 401a, each of the second light guide portions includes at least one second opening 401b, and a total area of the plurality of first openings 401a is smaller than a total area of the at least one second opening 401b.

According to the above embodiment, the light adjustment layer 40 is a patterned structure, and the patterned structure includes a plurality of patterned units, and each of the patterned units includes the first openings 401a on the light guide portion A1 and the second openings 401b on a portion of the second light guide portions A2 adjacent to the first light guide portions A1.

Specifically, by setting the light adjustment layer 40 to have a plurality of repeated patterned units, the light output from all parts of the light adjustment layer 40 is more uniform, the display effect is better, and the uniformity is higher.

Specifically, the light adjustment layer 40 is made of the same material, for example, a metal with high reflectivity can be used, and the metal is etched to form the first openings 401a and the second openings 401b, so that different light guide portions are set to have different opening areas to realize the adjustment of light transmittance.

Specifically, the shape of each of the first openings 401a and the second opening 401b may be a circle, or any one of a square, a diamond, an ellipse, and the like, which is not particularly limited.

It is appreciated that, by setting the light adjustment layer 40 as a patterned structure, the patterned structure includes a plurality of patterned units, and in each of the patterned units, the first light guide portion A1 includes a plurality of first openings 401a, the second light guide portions includes at least one second opening 401b, and the total area of the plurality of first openings 401a is smaller than the total area of the at least one second opening 401b, to adjust the light transmittances of the light portions A1 and the second light guide portions A2. Compared with the solution of using different materials to make the light adjustment layer 40, on the one hand, the production cost can be effectively saved; and on the other hand, an object of adjusting the light transmittance of the light adjustment layer 40 can be realized by flexibly adjusting the opening areas of the first openings 401a and the second opening 401b according to the actual needs of the display panel, and meanwhile, the patterned structure is also beneficial to realize large-angle bending of the backlight module.

Figure 4:
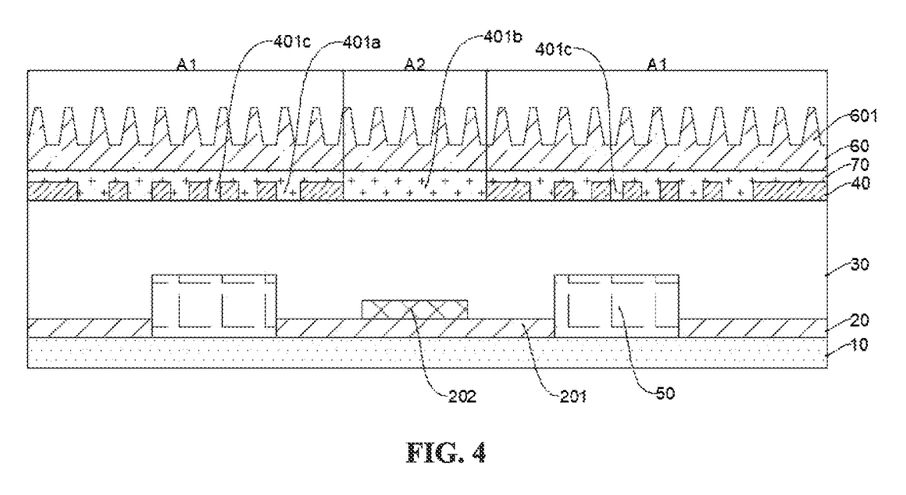
FIG. 4 is a schematic structural diagram of another backlight module with a patterned light adjustment layer provided in an embodiment of the present application.

According to the above-mentioned embodiment, as shown in FIG. 4, in the first light guide portions A1, the plurality of first openings 401a on the first light guide portion A1 have a plurality of opening areas, and the area of the first opening 401a directly facing the light source 50 is smaller than each area of remaining of the first openings 401a.

According to the above embodiment, among any two of the first openings 401a having different distances from the central opening 401c, an area of one of the first openings 401a close to the central opening 401c is less than an area of another one of the first openings 401a away from the central opening 401c.

It should be noted that the energy of light gradually attenuates during the light propagation process, and in a direction away from the central opening 401c, the opening area of the first opening 401a gradually increases to compensate for the attenuation of light during the light propagation process and ensure different positions of the first light guide portions A1 of the light adjustment layer 40 to have the same light intensity.

Specifically, in this embodiment, each of the first openings 401a and the center opening 401c being circular is taken as an example for description, wherein a diameter of the center opening 401c is 0-10 um, and a diameter of the first opening 401c far away from the center opening 401c is less than or equal to 50 um.

It is appreciated that, in one of the patterned units, the plurality of first openings 401a on the first light guide portions A1 have a plurality of opening areas, and the farther from the central opening 401c, the larger the opening areas of the openings 401a are, so that the attenuation of light during the propagation process can be effectively compensated, and the light intensity at different positions of the first light guide portions A1 of the light adjustment layer 40 can be ensured to be the same.

In one embodiment, the opening directly facing the light source 50 is defined as a central opening 401c, and the opening area of the central opening 401c is less than or equal to 2% of a light-emitting area of a corresponding one of the light sources 50, each of the first light guide portions A1 includes at least one annular light guide sub-portion A11, distances from the central opening 401c to different ones of the annular light guide sub-portions A11 are different, and a total opening area of the first openings 401a on any annular guide sub-portion A11 is less than or equal to 30% of an area of the annular guide sub-portion.

Specifically, the light-emitting area of each of the light sources 50 refers to a projected area of the light source 50 in a direction perpendicular to the light adjustment layer 40.

Figure 8:
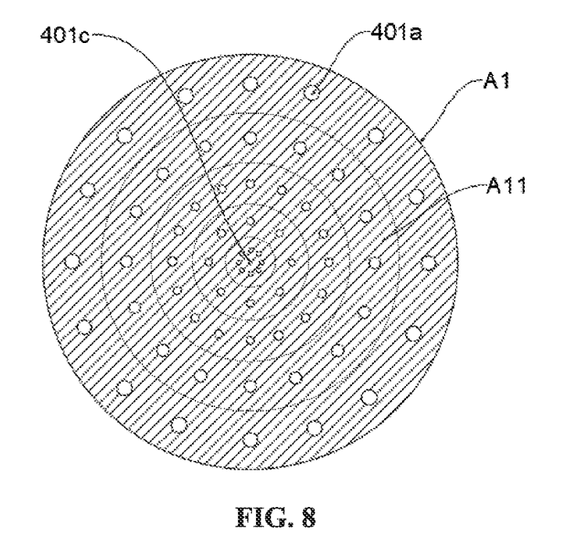
FIG. 8 is a schematic structural diagram of a first light guide portion in a patterned unit of a light adjustment layer provided by an embodiment of the present application.

Specifically, as shown in FIG. 8, the first light guide portions A1 includes at least one annular light guide sub-portions A11, and different annular light guide sub-portions A11 have different diameters and are coaxially sleeved. A width of the annular light guide sub-portions A11 (a difference in diameters between the outer ring and the inner ring) is not particularly limited, and may be equal or unequal.

Specifically, in this embodiment, the shapes and opening areas of the first openings 401a on the annular guide sub-portion A11 are the same.

Specifically, in any two of the annular light guide sub-portions A11, the opening area of any first opening 401a on one of the annular light guide sub-portion A11 close to the central opening 401c is smaller than the opening area of any first opening 401a on another one of the annular guide sub-portion A11 away from the central opening 401c.

Specifically, the opening areas of the plurality of first openings 401a on any one of the annular light guide sub-portions A11 is less than or equal to 30% of the total area of the annular light guide sub-portion. In a specific embodiment, the patterned unit corresponding to the first light guide portion A1 has a shape of circle with a diameter of 1 unit length, wherein a part with a diameter of 0-0.3 unit length is a part close to the central opening 401c, and a ring part with a diameter of 0-0.3 unit length is a part away from the central opening 401c, wherein an opening ratio of the portion away from the central opening 401c is less than or equal to 30%.

It is appreciated that, by setting an appropriate opening area, a light-emitting uniformity of the first light guide portions A1 can be balanced without impacting the normal reflection and conduction of light on the light adjustment layer 40, thereby improving the uniformity of the overall light output of the backlight module.

In one embodiment, the backlight module further includes:

an adhesive layer 70 disposed on a side of the light adjustment layer 40 away from the light source 50 and covers the light adjustment layer 40.

The color conversion layer 60 is disposed on the side of the adhesive layer 70 away from the light adjustment layer 40, and a side of the color conversion layer 60 away from the adhesive layer 70 is provided with a plurality of micro-reflection structures 601. Each of the micro-reflective structures 601 includes one of pyramids, prism glass, or the prisms.

Specifically, the material of the adhesive layer 70 includes, but is not limited to, transparent optical glue, and the adhesive layer 70 is used to bond the color conversion layer 60 to the light adjustment layer 40.

Specifically, the material of the color conversion layer 60 includes an organic material containing fluorescent color conversion particles. The color conversion layer 60 can convert the blue light emitted by the mini-LED into white light or light of other colors, which can be selected according to actual production conditions.

Specifically, the micro-reflection structures 601 may be uniformly arranged at intervals or dispersedly arranged.

Specifically, a shape of each of the micro-reflection structures 601 includes, but is not limited to, any one of a pyramid, a rib, and a tetrahedron, which can be selected according to actual conditions. The micro-reflection structures 601 are configured to converge the color-converted light, so that the color-converted light can be vertically emitted in a direction perpendicular to the substrate 10.

It is appreciated that, by disposing the adhesive layer 70 and the color conversion layer 60, and disposing a micro-reflection structure 601 on the color conversion layer 60, wherein the adhesive layer 70 is usually made of an organic material, which fills the openings on the light adjustment layer 40, the bending recovery performance of the backlight module can be thereby increased.

In one embodiment, the distance between the micro-reflection structures 601 is 10 um-100 um, and each of the micro-reflection structures 601 has a height of 5 um-50 um.

Specifically, the distance between the micro-reflection structures 601 may be one of 10 um, 20 um, 30 um, 40 um, 50 um, 65 um, 78 um, 82 um, 97 um, and 100 um, which can be selected according to actual production conditions.

Specifically, the height of each of the micro-reflection structures 601 can be one of 5 um, 8 um, 10 um, 12 um, 20 um, 28 um, 30 um, 38 um, 41 um, 43 um, and 50 um, which can be selected according to actual production conditions.

It is appreciated that, by reasonably limiting the distance between the micro-reflection structures 601 and the height of the micro-reflection structures 601, the light-converging effect of the color conversion layer 60 can be improved, so that the light-emitting direction of the color conversion layer is perpendicular to the substrate 10, and the light output direction is more uniform.

In one embodiment, the material of the light adjustment layer 40 includes any one of aluminum and silver, and the reflectivity of the light adjustment layer 40 is greater than or equal to 90%.

Specifically, the material of the light adjustment layer 40 may be a metal material, and the metal material generally has a high light reflectivity, and at the same time, the metal material is easily patterned by etching.

It is appreciated that, by setting the reflectivity of the light adjustment layer 40 to be greater than or equal to 90%, the light emitted by the light sources 50 can be transmitted as much as possible, so that the light output of the backlight module is more uniform, and meanwhile, the light is less lost in the process of propagation.

Figure 9:
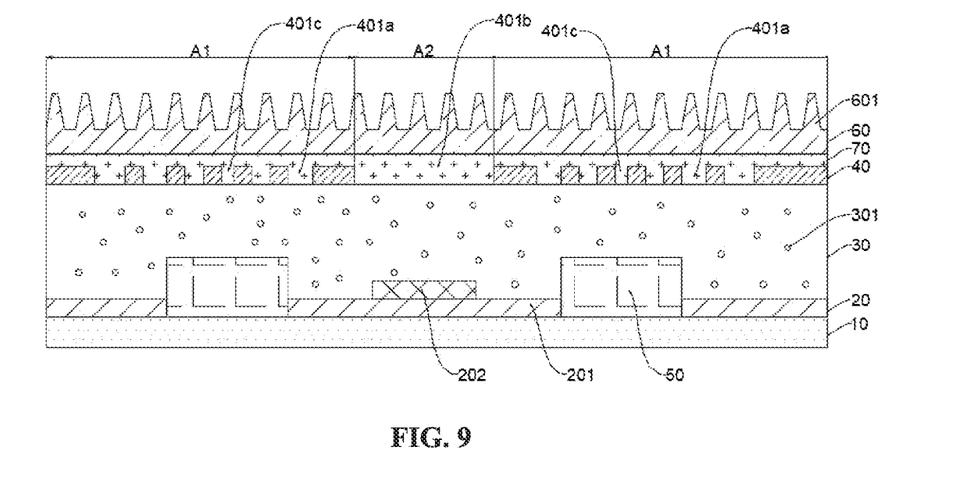
FIG. 9 is a schematic structural diagram of another backlight module provided by an embodiment of the present application.

In one embodiment, as shown in FIG. 9, the encapsulating adhesive layer is doped with diffusion powder 301, and the mass concentration of the diffusing powder 301 doped in the encapsulating adhesive layer is 10%-20%.

Specifically, the material of the encapsulating adhesive layer includes, but is not limited to, epoxy-based encapsulant, silicone-based encapsulant, polyurethane encapsulant, and UV-curable encapsulant.

Specifically, the material of the diffusion powder 301 can be a hard amide material, and the mass concentration of the diffusion powder 301 can be any one of 10%, 12%, 14%, 15%, 17%, and 20%, which can be specifically adjusting based on actual production conditions, the diffusing powder 301 is a transparent material, and a diameter of the diffusing powder 301 can be 1-10 um.

Specifically, a small amount of light conducted in the encapsulating adhesive layer is diffused due to an action of the diffusing powder 301, so as to achieve a purpose of emitting light from a front view direction of the second light guide portions A2.

It is appreciated that, by setting the diffusion powder 301 in the encapsulating adhesive layer, the mass concentration of the diffusion powder 301 is within 10% to 20%, which can diffusely reflect and spread the light transmitted in a few encapsulating adhesive layers to the second light guide portions A2, and then the light is emitted from the front view direction of the second light guide portions A2.

In one embodiment, a specular reflection ratio of the specular reflection sub-layer 201 for the reflected light at each angle is greater than or equal to 90%, and the diffuse reflection sub-layer 202 for the reflected light at each angle is greater than or equal to 90%.

Specifically, a material of the specular reflection sub-layer 201 includes, but is not limited to, a highly reflective metal material, which may be gold, silver, aluminum, copper, or alloys thereof, or the like.

Specifically, a material of the diffuse reflection sub-layer 202 includes, but is not limited to, an organic resin-based mixture containing diffusing particles, and the organic resin-based material may be ink or white photoresist, wherein the diffusing particles include, but are not limited to inorganic particles or polymer material particles, such as silicon dioxide, titanium dioxide, etc., and may have a diameter ranging from 1 um to 10 um.

It is appreciated that by displaying the reflection ratio of the specular reflection sub-layer 201 and the diffuse reflection sub-layer 202, the light loss of the light emitted by the light sources 50 during the homogenization process can be effectively reduced, and the light output efficiency of the backlight module can be improved.

The present application further provides a mobile terminal, including the backlight module and a display main body according to any of the above embodiments, and the display main body and the backlight module are combined into a whole.

Specifically, mobile terminals include but are not limited to the following types: rollable or foldable mobile phones, watches, wristbands, TVs or other wearable display or touch electronic devices, as well as flexible smart phones, tablet computers, notebook computers, Desktop monitors, TV sets, smart glasses, smart watches, ATM machines, digital cameras, automotive monitors, medical displays, industrial control displays, electronic paper books, electrophoretic display devices, game consoles, transparent displays, double-sided displays, naked-eye 3D displays, mirror display devices, transflective display devices, etc.

To sum up, in the present application, by arranging the light adjustment layer 40 and the reflection layer 20 opposite to each other, the light adjustment layer 40 includes a plurality of first light guide portions A1 and a plurality of second light guide portions A2, the first light guide portions A1 are disposed opposite to the light sources 50, the second light guide portions A2 are arranged between the first light guide portions A1, the light transmittance of the first light guide portions A1 is lower than the light transmittance of the second light guide portions A2, and a reflection layer is provided 20 includes a specular reflection sub-layer 201 and a diffuse reflection sub-layer 202, the diffuse reflection sub-layer 202 overlaps with at least a part of at least one of the second light guide portions A2, and the specular reflection sub-layer 201 overlaps with at least a part of at least one of the first light guide portions A1. The diffuse reflection sub-layer 202 is arranged corresponding to the second light guide portion A2, and the specular reflection sub-layer 201 is arranged corresponding to the first light guide portion A1. Light transmission is carried out by a combination of the specular reflection sub-layer 201 and the diffuse reflection sub-layer 202, the light emitted by the light sources 50 forms a large-angle light transmission between a light source port and a near-light source area through a light adjustment layer 40 and a specular reflection sub-layer 201, which guides more light to a position of the gap of the light sources 50, and at the position of the gap of the light sources 50, the diffuse reflection coating is used to change a large-angle propagation mode of the light at the position of the gap of the light sources 50, so that it can emit light in a front view direction, increase the brightness between the light sources 50, and achieve an effect of uniform light output on an entire surface of the backlight module. The above technical solution can replace the conventional uniform light film in the mini-LED backlight module, to greatly reduce a thickness of the backlight module from 1.5-2 mm to less than 0.5 mm. Because the thickness of the backlight module can be effectively reduced, the backlight module can also have better bending performance.

It is appreciated that for those of ordinary skill in the art, equivalent substitutions or changes can be made according to the technical solutions and inventive concepts of the present application, and all these changes or substitutions shall fall within the protection scope of the appended claims of the present application.

What is claimed is:

1. A backlight module, comprising:
   a substrate;
   a plurality of light sources arranged on the substrate at intervals;
   a reflection layer disposed on the substrate and adjacent to at least one of the light sources;
   an encapsulation layer disposed on the light sources and the reflection layer; and
   a light adjustment layer disposed on a side of the encapsulation layer away from the light sources, wherein the light adjustment layer comprises a plurality of first light guide portions and a plurality of second light guide portions, one of the first light guide portions and one of the light sources are arranged opposite to each other, each of the second light guide portions is arranged between the first light guide portions, and a light transmittance of the first light guide portions is smaller than a light transmittance of the second light guide portions;
   wherein the reflection layer comprises a specular reflection sub-layer and a diffuse reflection sub-layer, the diffuse reflection sub-layer overlaps with at least a part of at least one of the second light guide portions, and the specular reflection sub-layer overlaps with at least a part of at least one of the first light guide portions.

2. The backlight module according to claim 1, wherein the diffuse reflection sub-layer is stacked on the specular reflection sub-layer, or
   the specular reflection sub-layer is provided with an opening, and the diffuse reflection sub-layer is disposed in the opening.

3. The backlight module according to claim 1, wherein the diffuse reflection sub-layer partially overlaps with at least one of the first light guide portions.

4. The backlight module according to claim 1, wherein each of the first light guide portions comprises a plurality of first openings, each of the second light guide portions comprises at least one second opening, and a total area of the plurality of first openings is smaller than a total area of the at least one second opening.

5. The backlight module according to claim 4, wherein, in each of the first light guide portions, a plurality of the first openings have a plurality of opening areas, one of the first openings facing one of the light sources is a central opening, and an area of the central opening is smaller than each area of remaining of the first openings.

6. The backlight module according to claim 5, wherein among any two of the first openings having different distances from the central opening, an area of one of the first openings close to the central opening is less than an area of another one of the first openings away from the central opening.

7. The backlight module according to claim 5, wherein an opening area of the central opening is less than or equal to 2% of a light-emitting area of a corresponding one of the light sources, each of the first light guide portions comprises at least one annular light guide sub-portion, distances from the central opening to different ones of the annular light guide sub-portions are different, and a total opening area of the first openings on any annular guide sub-portion is less than or equal to 30% of an area of the annular guide sub-portion.

8. The backlight module according to claim 1, further comprising:
   an adhesive layer disposed on a side of the light adjustment layer away from the light sources, and covering the light adjustment layer; and
   a color conversion layer disposed on a side of the adhesive layer away from the light adjustment layer, wherein a plurality of micro-reflection structures is disposed on a side of the color conversion layer away from the adhesive layer, and the micro-reflection structures comprise one of pyramids, prism glass, or prisms.

9. The backlight module according to claim 8, wherein a spacing between the micro-reflection structures is 10 μm to 100 μm, and a height of the micro-reflection structures is 5 μm to 50 μm.

10. The backlight module according to claim 1, wherein a material of the light adjustment layer comprises any one of aluminum and silver, and a reflectivity of the light adjustment layer is greater than or equal to 90%.

11. The backlight module according to claim 1, wherein the encapsulating adhesive layer is doped with diffusion powder, and a mass concentration of the diffusing powder doped in the encapsulating adhesive layer is 10%-20%.

12. The backlight module according to claim 1, wherein a material of the specular reflection sub-layer comprises one of gold, silver, aluminum, copper, and alloys thereof, a material of the diffuse reflection sub-layer comprises diffusion particles and an organic resin-based material, the organic resin-based material comprises ink or white photoresist, and the diffusion particles comprise at least one of silicon dioxide and titanium dioxide.

13. A mobile terminal, comprising a backlight module and a display body, wherein the display body and the backlight module are combined into a whole, and the backlight module comprising:
   a substrate;
   a plurality of light sources arranged on the substrate at intervals;
   a reflection layer disposed on the substrate and adjacent to at least one of the light sources;
   an encapsulation layer disposed on the light sources and the reflection layer;
   a light adjustment layer disposed on a side of the encapsulation layer away from the light sources, wherein the light adjustment layer comprises a plurality of first light guide portions and a plurality of second light guide portions, one of the first light guide portions and one of the light sources are arranged opposite to each other, each of the second light guide portions is arranged between the first light guide portions, and a light transmittance of the first light guide portions is smaller than a light transmittance of the second light guide portions;
   wherein the reflection layer comprises a specular reflection sub-layer and a diffuse reflection sub-layer, the diffuse reflection sub-layer overlaps with at least a part of at least one of the second light guide portions, and the specular reflection sub-layer overlaps with at least a part of at least one of the first light guide portions.

14. The mobile terminal according to claim 13, wherein the diffuse reflection sub-layer is stacked on the specular reflection sub-layer, or
   the specular reflection sub-layer is provided with an opening, and the diffuse reflection sub-layer is disposed in the opening.

15. The mobile terminal according to claim 13, wherein the diffuse reflection sub-layer partially overlaps with at least one of the first light guide portions.

16. The mobile terminal according to claim 13, wherein each of the first light guide portions comprises a plurality of first openings, each of the second light guide portions comprises at least one second opening, and a total area of the plurality of first openings is smaller than a total area of the at least one second opening.

17. The mobile terminal according to claim 16, wherein, in each of the first light guide portions, a plurality of the first openings have a plurality of opening areas, one of the first openings facing the one of the light sources is a central opening, and an area of the central opening is smaller than each area of remaining of the first openings.

18. The mobile terminal according to claim 17, wherein among any two of the first openings having different distances from the central opening, an area of one of the first openings close to the central opening is less than an area of another one of the first openings away from the central opening.

19. The mobile terminal according to claim 17, wherein an opening area of the central opening is less than or equal to 2% of a light-emitting area of a corresponding one of the light sources, each of the first light guide portions comprises at least one annular light guide sub-portion, distances from the central opening to different ones of the annular light guide sub-portions are different, and a total opening area of the first openings on any annular guide sub-portion is less than or equal to 30% of an area of the annular guide sub-portion.

20. The mobile terminal according to claim 13, further comprising:
   an adhesive layer disposed on a side of the light adjustment layer away from the light sources, and covering the light adjustment layer; and
   a color conversion layer is arranged on a side of the adhesive layer away from the light adjustment layer, wherein a plurality of micro-reflection structures is disposed on a side of the color conversion layer away from the adhesive layer, and the micro-reflection structures comprise one of pyramids, prism glass, or the prisms.

* * * * *